United States Patent [19]

Sell

[11] Patent Number: 5,655,794
[45] Date of Patent: Aug. 12, 1997

[54] PNEUMATIC CONNECTOR

[75] Inventor: Leslie J. Sell, Bothell, Wash.

[73] Assignee: Ingersoll-Rand Company, Woodcliff Lake, N.J.

[21] Appl. No.: 556,788

[22] Filed: Nov. 2, 1995

[51] Int. Cl.$^6$ .................................................. F16L 39/02
[52] U.S. Cl. ........................... 285/25; 285/914; 285/124.1
[58] Field of Search ....................... 285/137.1, 914, 285/25

[56] References Cited

U.S. PATENT DOCUMENTS

| | | | |
|---|---|---|---|
| 3,747,632 | 7/1973 | Kok et al. | 285/137.1 |
| 3,753,575 | 8/1973 | Tracy | 285/137.1 |
| 3,848,902 | 11/1974 | Modrey | 285/137.1 |
| 4,007,951 | 2/1977 | Legris | 285/137.1 |
| 4,319,772 | 3/1982 | Weiriun et al. | 285/137.1 |
| 5,316,347 | 5/1994 | Arosio | 285/137.1 |

FOREIGN PATENT DOCUMENTS

| | | | |
|---|---|---|---|
| 3016611 | 11/1981 | Germany | 285/137.1 |

*Primary Examiner*—Eric K. Nicholson
*Attorney, Agent, or Firm*—Walter C. Vliet

[57] ABSTRACT

A pneumatic connector between a hoist and a hoist pendant is provided with tapered holes and ferrules to progressively compress and retain interconnecting pneumatic tubing and further provides for assembly of a protective sheath. The connector further provides limited free rotation and a quick disconnect face seal accomplished by a single rotating threaded sleeve.

7 Claims, 2 Drawing Sheets

PNEUMATIC CONNECTOR

BACKGROUND OF THE INVENTION

This invention relates generally to connectors for pneumatic pressure fluid conveying devices such as hoses and more particularly to a connector for quick connecting various pneumatic devices together as, for example, a remote pneumatic control pendant for an air control valve for a hoist. In the past such connections have been cumbersome, difficult to make, and subject to premature failure due their relative stiffness working the joint upon movement of the pendant control relative to the fixed control valve.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is obtained by providing a pneumatic connector comprising a terminal of generally cylindrical shape provided with an end cap; the end cap being further provided with a series of counter bored radial holes for receiving pneumatic pressure fluid tubing passed through the cylindrical portion of the terminal and disposed in the holes; a hollow bored tapered out ferrule disposed within the end of the tubing and within the counter bored radial holes which on assembly retain the tubing within the counter bored radial holes with increased wedging action.

The foregoing and other aspects of the invention will become apparent from the following detailed description of the invention when considered in conjunction with the accompanying drawing figures.

BRIEF DESCRIPTION OF THE DRAWING FIGURES

DETAILED DESCRIPTION

Figure 1:
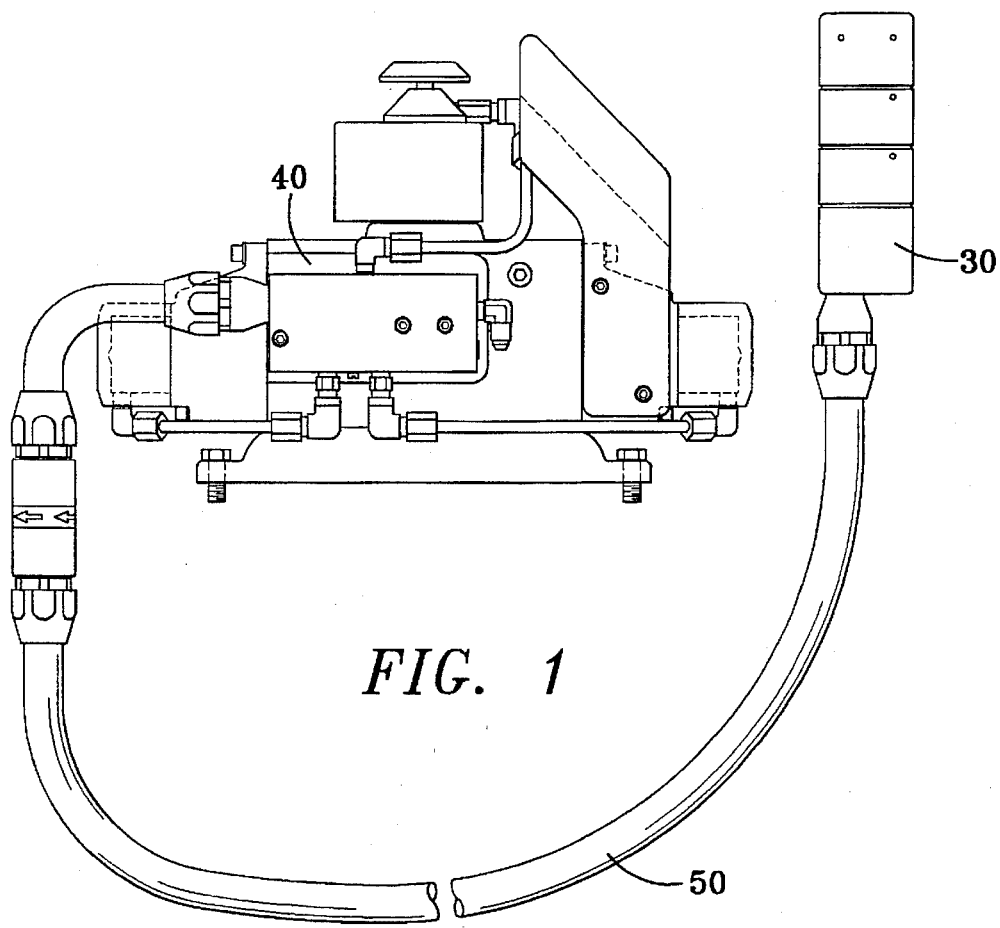
FIG. 1 is a schematic showing a typical application of the present invention.

This invention pertains to a connector which provides simple disconnect and recoupling of bundled pneumatic supply and signal lines. A connector of this type is particularly useful for quick connecting various pneumatic devices together in series. A typical application of the present invention is shown in FIG. 1 in which a hand held remote pneumatic control station 30 is shown connected to a directional air control valve 40 by means of an air signal and supply line 50. The advantage is that the hand held control station can be quickly disconnected for repair or replacement. A further advantage of this device is that it allows the length of the bundled supply to be increased or reduced by simple addition or subtraction of a tubing bundle of any length having mating connector halves at each end.

A significant feature of this coupling is the method for attaching the supply and signal lines to each half of the connector in a manner which allows the maximum number of lines to be accommodated in the smallest possible space. This accomplishment allows the connector to be similar in diametral size to the protective sheath that the bundled supply and signal lines pass through. This is particularly important for hand held control stations since a large and bulky connector would impede free movement by catching on obstructions.

A further feature of this device is that a single threaded sleeve is used to connect the two halves of the coupling and also compress the rubber gasket between them to form an airtight seal.

Figure 2:
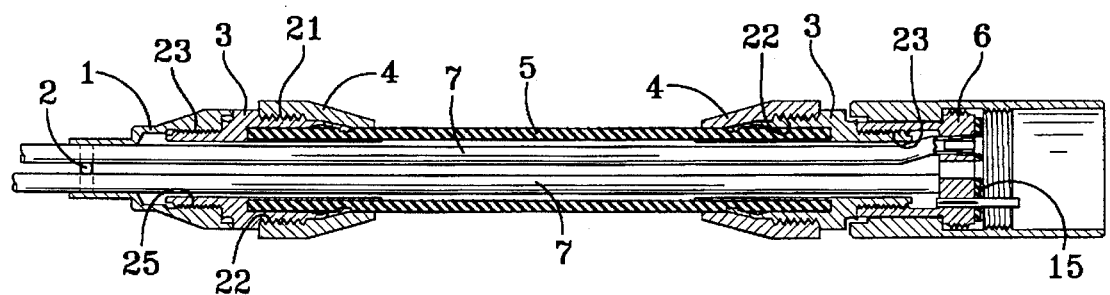
FIG. 2 is a cross section of a connector and hose assembly showing a device connection on the left and a female quick connection device according to the present invention on the right.
Figure 3:
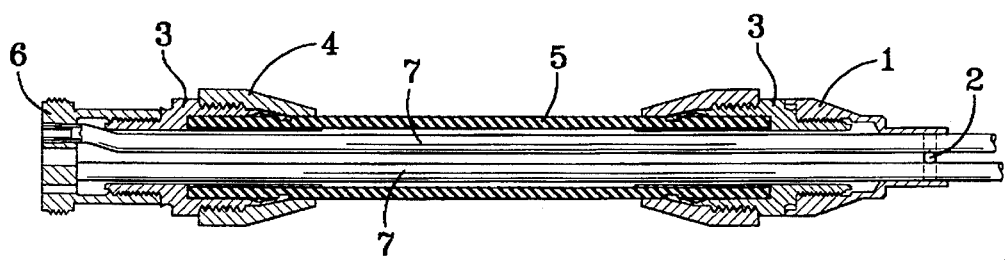
FIG. 3 is a cross section showing the male quick connection device according to the present invention on the left and a device connection on the right.

Referring to FIGS. 2 and 3, the connector and tubing bundle is shown in cross section uncoupled. End fittings 1 allow each half to be connected to its respective device by pins 2 which also allow approximately 180 degrees of rotational freedom. This rotational freedom is particularly advantageous for hand held devices connected by the tubing bundle since it relieves torsional loading caused by the tendency of the tubing bundle to twist when the hand held device is moved to different positions. Standard commercial conduit fittings consisting of a threaded coupling 3 and compression nut 4 are used to connect the protective sheaf 5 of the tubing bundle to the swivel end and coupling end of each assembly. Threaded sleeve 3 is provided with threads on each end, a thread 21 to engage the threads 22 of the compression nut and a thread 23 to engage the internal thread 24 of the terminal 6 or alternatively the internal threads 25 of the end fitting 1.

Figure 5:
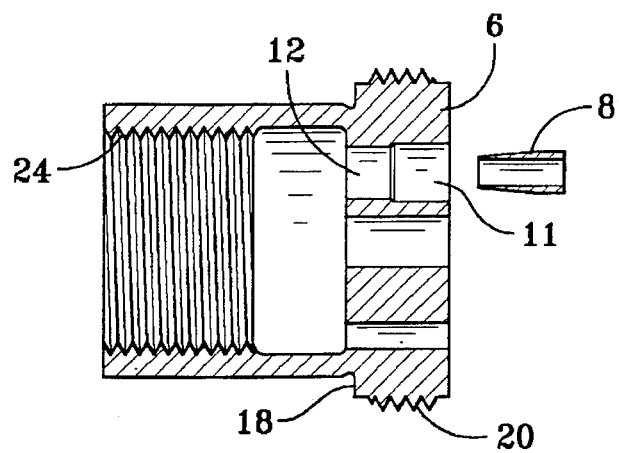
FIG. 5 is a cross section showing a detail of the terminal end and the tapered ferrules according to the present invention.

Referring to FIG. 5, each half of the connector has identical tubing end terminal 6 to which the internal supply and signal lines are attached. Each terminal is generally cylindrical in shape and formed with an end cap which has a series of radial holes 12 through it to accommodate the required number of supply and signal lines. These holes are sized to allow the tubing 30 to pass through easily and they are counter bored 11 on the outer face of the terminal to receive tapered retaining ferrules 8.

Figure 4:
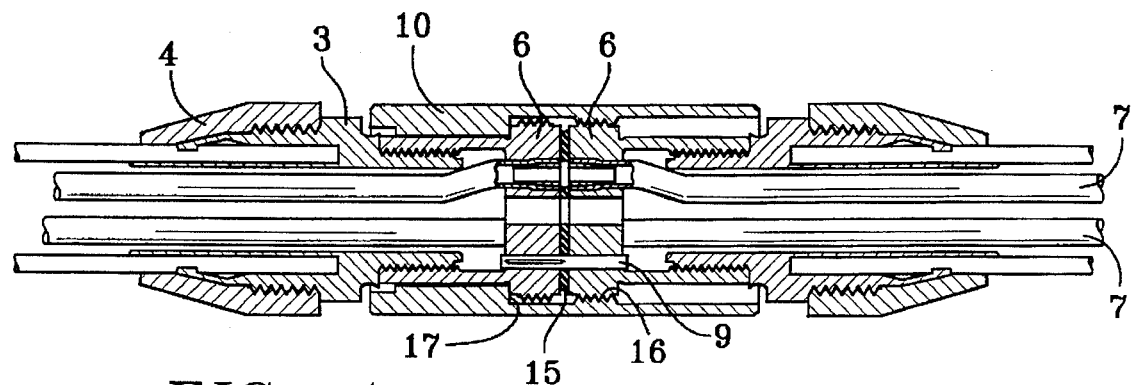
FIG. 4 is a cross section showing the assembled quick disconnector according to the present invention.
Figure 6:
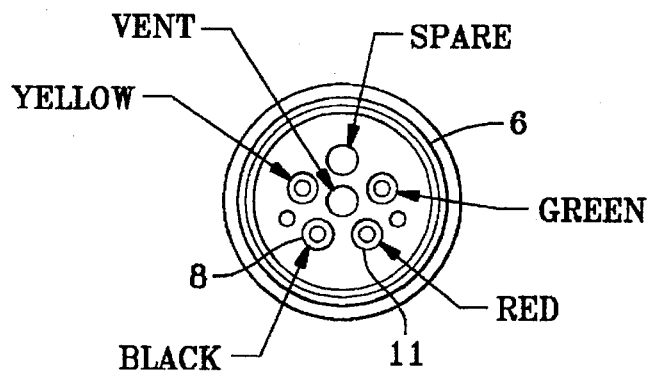
FIG. 6 shows an end view of the female connector showing the orientation of the component lines.
Figure 7:
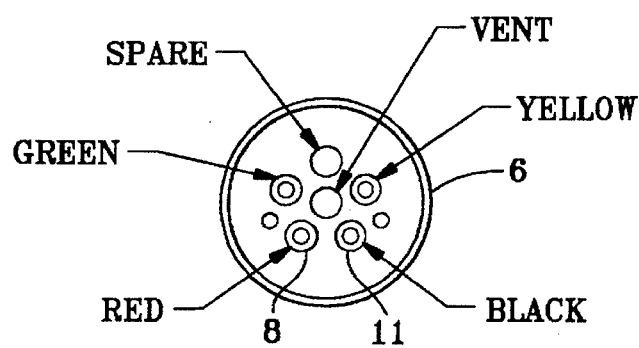
FIG. 7 is an end view of the male connector showing the complimentary orientation of the component lines.

Referring to FIG. 4, shown is a view of the connector when assembled. Lines 7 are passed through terminals 6 until they slightly protrude from the face of the terminal. Hollow bored tapered ferrules 8 are then placed into the end of each line 7 and then simultaneously driven with an impact tool into the counter bores in the terminal. In this manner the lines are driven back flush with the face of the terminal and the ferrules, driven into the end of each line, cause each respective line to expand against the counter bore. Any attempt to pull the line out of the terminal pulls the tapered ferrule further into the counter bore causing it to lock tighter against the step between the counter bore and the through hole. The resulting connection is as strong as the line itself. In the assembled connector, the terminals 6 are timed by alignment pins 9 and pulled together by sleeve shoulder 17 and acting against terminal shoulder 18, the threads 16 of threaded sleeve 10 in engagement with the external threads 20 on the terminal 6 against rubber seal gasket 15. The supply and signal lines are color coded as shown in FIG. 6 and FIG. 7.

Having described my invention in terms of a preferred embodiment I do not wish to be limited in the scope of my invention except as claimed.

What is claimed is:

1. A pneumatic connector comprising:
   a terminal of generally cylindrical shape provided with an end cap;
   said end cap being further provided with a series of counter bored internal taper radial holes for receiving pneumatic pressure fluid tubing passed through the cylindrical portion of said terminal and disposed in said holes;
   a hollow bored outside tapered ferrule disposed within the end of said tubing and within said counter bored internal taper radial holes which on assembly retain said tubing within said counter bored radial holes with increased wedging action between the outside taper of said ferrule and the internal taper of said radial holes;
   said terminal being further provided with an external thread and an internal thread for assembly with a threaded sleeve and a threaded coupling; and
   said threaded coupling is further connected to a compression nut to effect assembly of a protective sheath to provide a protective sheath and tubing assembly.

2. A pneumatic connector according to claim 1, wherein:
   said terminal is further provided with a gasket means for face sealing of said radial holes upon assembly of two terminals secured in face to face relationship by said threaded sleeve.

3. A pneumatic connector according to claim 1, wherein:
   said end cap is further provided with alignment means for fixing the orientation of said radial holes on assembly.

4. A pneumatic connector according to claim 3, wherein:
   said alignment means further comprises alignment ends protruding from end external face of said end cap.

5. A pneumatic connector according to claim 1, wherein:
   said protective sheath is terminated in a second compression nut and threaded coupling assembly which in turn is further terminated in an end fitting provided for attachment to a control means.

6. An end fitting according to claim 1, wherein:
   said end fitting is further provided with means for permitting free limited rotation of said end fitting and hence said pneumatic connector assembly relative to said control means.

7. A pneumatic connector according to claim 6, wherein:
   said means for permitting free limited rotation further comprises a pin and slot.

* * * * *